United States Patent [19]

Kasai et al.

[11] Patent Number: 5,064,401
[45] Date of Patent: Nov. 12, 1991

[54] APPARATUS FOR MANUFACTURING SAUSAGES OR THE LIKE

[75] Inventors: Minoru Kasai, Ebina; Minoru Nakamura, Tokyo, both of Japan

[73] Assignee: Hitec Co., Ltd., Tokyo, Japan

[21] Appl. No.: 515,174

[22] Filed: Apr. 26, 1990

[30] Foreign Application Priority Data

Apr. 27, 1989 [JP] Japan .................................. 1-108175

[51] Int. Cl.5 ............................................ A22C 11/00
[52] U.S. Cl. ........................................ 452/46; 452/47; 452/51
[58] Field of Search ........................ 452/46, 47, 48, 51

[56] References Cited

U.S. PATENT DOCUMENTS

| 3,964,128 | 6/1976 | Townsend et al. | 452/51 |
| 4,091,505 | 5/1978 | Müller et al. | 452/47 |
| 4,570,301 | 2/1986 | Beckman et al. | 452/46 |
| 4,627,130 | 12/1986 | Nausedas et al. | 452/47 |

Primary Examiner—Willis Little
Attorney, Agent, or Firm—Wegner, Cantor, Mueller & Player

[57] ABSTRACT

Disclosed is an apparatus for manufacturing sausages or the like having a nozzle for stuffing a material such as a meat emulsion into a casing for sausages or the like, a pump for supplying the material into the nozzle, a chuck for rotating the casing stuffed by the nozzle, and a linking device for clamping the stuffed casing discharged from the chuck and for forming the casing stuffed with the material into the form of a chain in cooperation with the chuck. The apparatus includes a device for driving the chuck, the device including a housing, a rotary member accommodated rotatably inside the housing and adapted to rotate the chuck with the chuck inserted and fixed therein, a bearing for rotatably supporting the rotary member, a sealing device for preventing the entrance of a foreign substance such as the material into the bearing, and a rotation transmitting device for driving the rotary member, the bearing having a sealing member for sealing a lubricant for the bearing in the bearing.

15 Claims, 9 Drawing Sheets

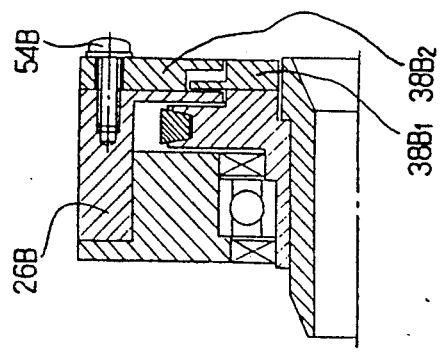
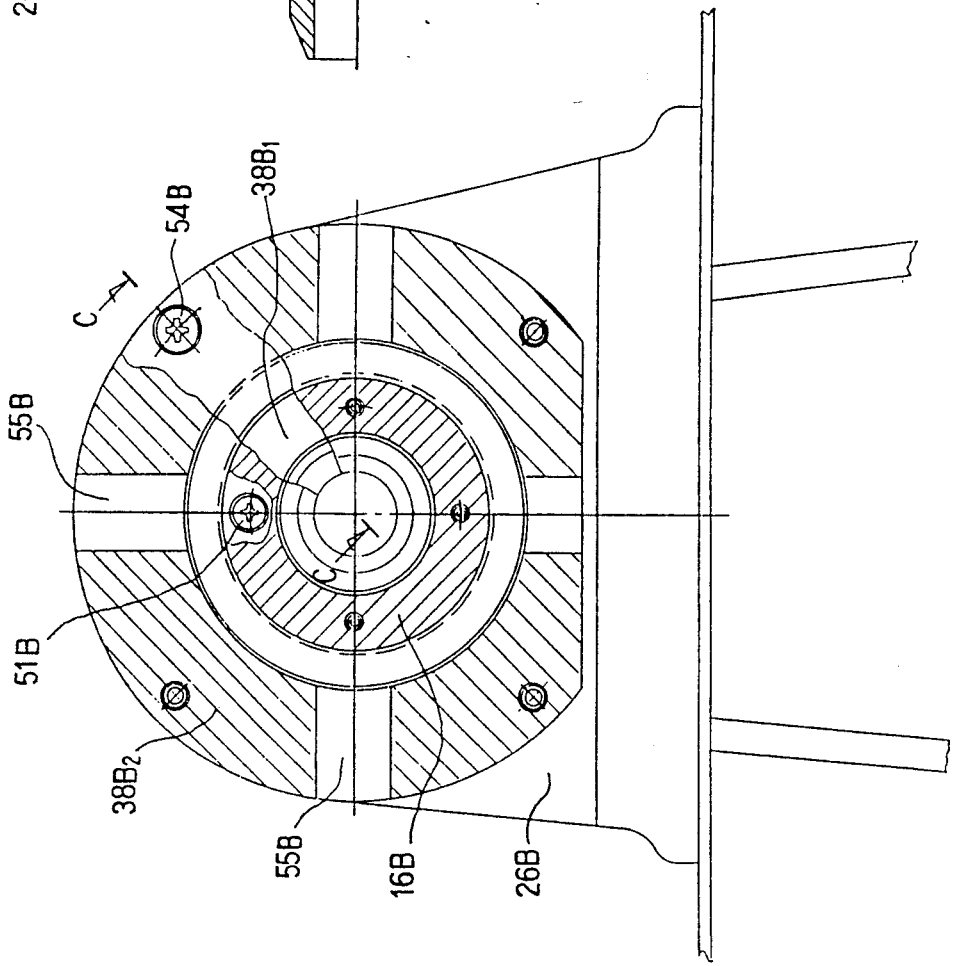
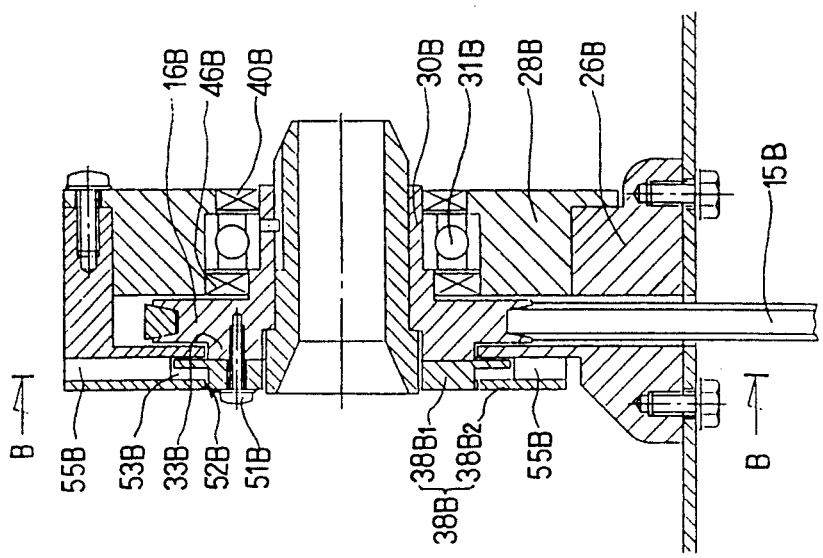

1

APPARATUS FOR MANUFACTURING SAUSAGES OR THE LIKE

BACKGROUND OF THE INVENTION

1. Field of the Invention

The present invention relates to an apparatus for manufacturing sausages or the like, and more particularly to an apparatus for manufacturing sausages or the like having a rotary member driving device which is not affected by the entrance thereinto of a material, water, and the like.

2 Description of the Related Art

Hitherto, apparatus for manufacturing products (e.g., wieners) have been known in which a material such as a meat emulsion is discharged from a nozzle and is filled into a casing, and the casing is twisted to link the individual portions filled with the material into the form of a chain. (Refer to Japanese Patent Publication Nos. 27509/1965 (U.S. Pat. No. 3,115,688) and 13329/1989.) (U.S. Pat. No. 4,539,796).

With the conventionally known apparatus for manufacturing sausages or the like, in order to give twists to a casing stuffed with a material such as a meat emulsion, the casing is held by a chuck and rotation is imparted to the casing. The apparatus is constructed such that a part of a rotation imparting mechanism for imparting rotation to the casing is immersed in lubricating oil in a hermetically sealed housing. (Hereafter, the lubricating structure of this type will be referred to as the wet-type lubricating structure.)

With reference to FIG. 9, a detailed description will be given of an example of an apparatus for manufacturing a chain of wieners or the like having the above-described known wet-type lubricating structure. The structure described here is the lubricating structure of a chuck rotating mechanism disclosed in the aforementioned Japanese Patent Publication No. 13329/1989, (U.S. Pat. No. 4,539,796) and it can be understood that the lubricating structure of the chuck rotating mechanism of the aforementioned Japanese Patent Publication No. 27509/1965 (U.S. Pat. No. 3,115,668) is basically identical with the same.

A chuck 101 is inserted in a cylindrical shaft portion 103 of an external gear 102 which is rotatively driven by meshing with another external gear 104. The external gears 102 and 104 are accommodated in a sealed housing 105, lubricating oil being filled in the housing 105. A rotating shaft 106 of the external gear 104 is rotatively driven by a sprocket 107 provided at its end. In this example, the sprocket 107 is rotatively driven by a motor 108, and its rotation imparting mechanism is constituted by a combination of belts 109 and 110, a bevel gear 111, and a chain 112.

The following drawbacks have been experienced with the above-described known chuck rotating mechanism.

The operation of stuffing the casing with a material is generally carried out as follows: First, a piston rod 114 of a cylinder 113 advances and, a nozzle 115 passes through an unillustrated block for slidably accommodating the nozzle and having a port communicating with a meat stuffing pump 116, allowing a casing (not shown) to be fitted over an outer periphery of the nozzle 115. At the same time, a tip of the nozzle 115 is partially inserted into the chuck 101. As the meat emulsion or the like, which is a material, is discharged from the tip of the nozzle 115, the discharged material is filled in the casing. Since the outside diameter of the casing stuffed with the material is constricted by a linking device 117 while the casing rotates together with the chuck 101, twists are produced at that portion, thereby allowing sausages or the like to be produced in the form of a chain of linked products. Since the manner or a detailed mechanism of stuffing and twisting are described in detail in the aforementioned Japanese Patent Publication No. 27509/1965, (U.S. Pat. No. 3,115,668) a description thereof will be omitted herein.

Since the housing 105 is provided with the external gears 102 and 104, a bearing and oil seals are provided for these gears. (Detailed illustrations are omitted herein.)

With the above-described known chuck rotating mechanism, there frequently occur cases where the material (the meat emulsion or the like) discharged from the nozzle 115 leaks from the nozzle (the reason: when the material is charged into the casing from the nozzle 115, after the casing has been finally stuffed with the material, the material is still discharged from the nozzle 115 by residual pressure although the casing has gone), and this leaked material enters the housing 105 by overriding the oil seal. In addition, water can frequently enter the housing 105 at the time of cleaning with water. Consequently, these entering objects are gradually accumulated inside the housing 105, thereby causing deterioration of the lubricating oil.

With the above-described known manufacturing apparatus, since cases of damage caused to the casings by the linking device are practically nil, the entrance of the aforementioned objects into the housing 105 from the oil seal on the linking device side.

In addition, the housing 105 is provided with bearings and oil seals, as described above, and the bearings and oil seals are contaminated by the entering objects, thereby resulting in rusting, abnormal wear, partial wear, and breakage. Since such rusting, abnormal wear, partial wear, and breakage also occur at the meshing portions of the external gears 102, 104, with the conventional chuck rotating mechanism, there have been technical problems in that it suffers a drawback in terms of durability and that parts replacement must be conducted frequently. In particular, in the apparatus using the conventional sealed housing 105, it takes much time and trouble to disassemble the housing 105 and replace the internal parts and lubricating oil.

SUMMARY OF THE INVENTION

Accordingly, an object of the present invention is to provide an apparatus for manufacturing sausages or the like having a rotary member driving device in which a rotatively driving mechanism incorporated in a housing is simplified and maintenance is facilitated by arranging the housing as an open type by separately lubricating a bearing and effecting the driving of a rotary member in a non-lubricated condition, thereby overcoming the above-described drawbacks of the wet-type lubricating system of the conventional art.

To this end, in accordance with the present invention, there is provided an apparatus for manufacturing sausages or the like having a nozzle for stuffing a material such as a meat emulsion into a casing for sausages or the like, a pump for supplying the material into the nozzle, a chuck for rotating the casing stuffed by the nozzle, and a linking device for clamping the stuffed casing discharged from the chuck and for forming the casing stuffed with the material into the form of a chain in cooperation with the chuck, the apparatus comprising: a device for driving the chuck, the device including a housing, a rotary member accommodated rotatably inside the housing and adapted to rotate the chuck with the chuck inserted and fixed therein, a bearing for rotatably supporting the rotary member, sealing means for preventing the entrance of a foreign substance such as the material into the bearing, and rotation transmitting means for driving the rotary member, the bearing having a sealing member for sealing a lubricant for the bearing in the bearing.

The above and other objects, features and advantages of the present invention will become more apparent from the following detailed description of the invention when read in conjunction with the accompanying drawings.

BRIEF DESCRIPTION OF THE DRAWINGS

FIG. 6A is a side cross-sectional view illustrating still another embodiment of a rotatively driving mechanism of the rotary member in accordance with the present invention;

FIG. 6B is a partially cutaway front elevational view of a noncontact-type sealing means taken in the direction of B in FIG. 6A;

FIG. 6C is a partial cross-sectional view of the noncontact-type sealing means taken in the direction of C in FIG. 6B;

FIG. 9 is a cross-sectional view illustrating essential portions of a conventional apparatus for manufacturing sausages or the like.

DESCRIPTION OF THE PREFERRED EMBODIMENTS

Referring now to the accompanying drawings, a description will be given of the preferred embodiments of the present invention.

Figure 1:
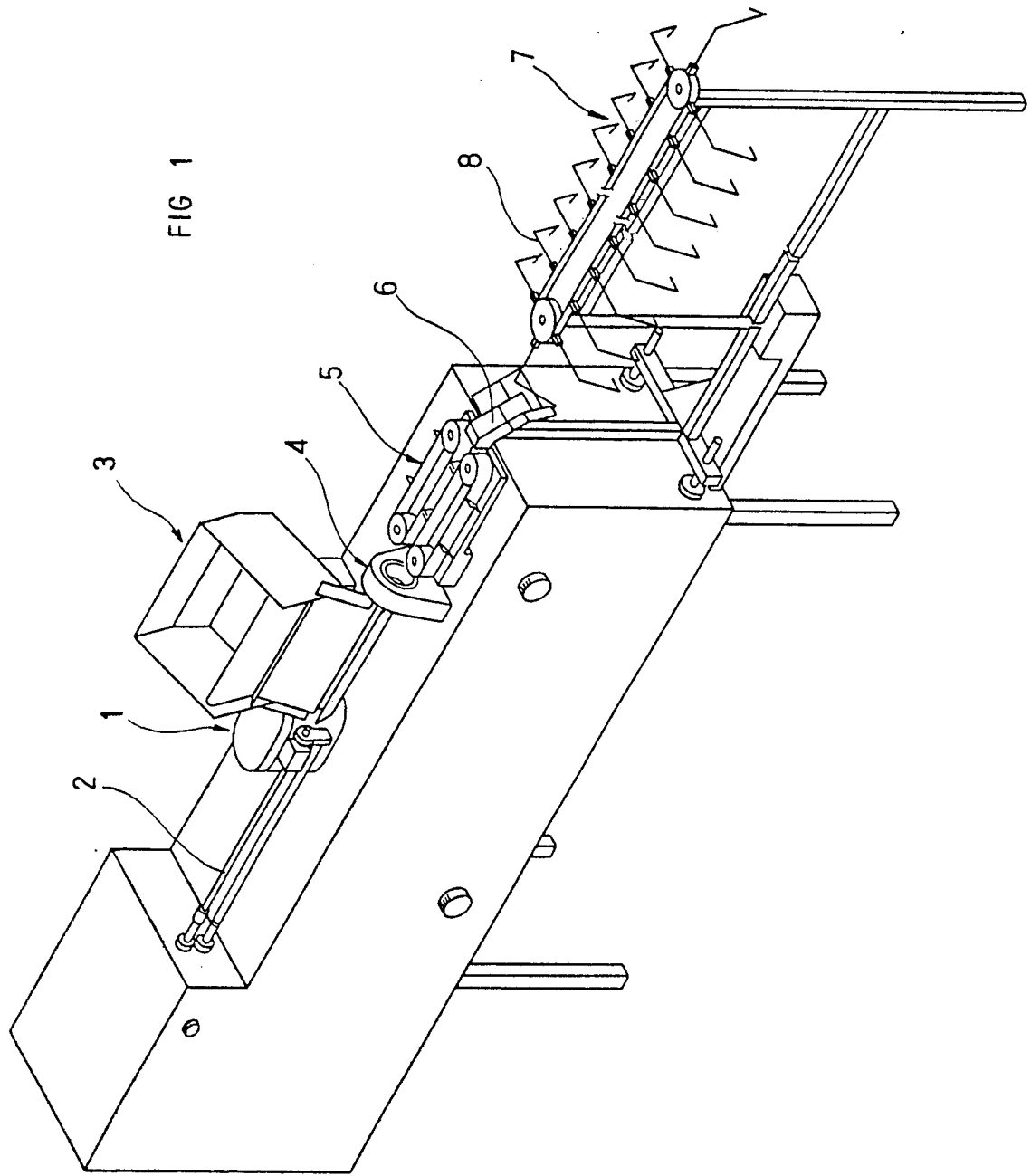
FIG. 1 is an overall perspective view of an apparatus for manufacturing sausages or the like in accordance with an embodiment of the present invention.
Figure 2:
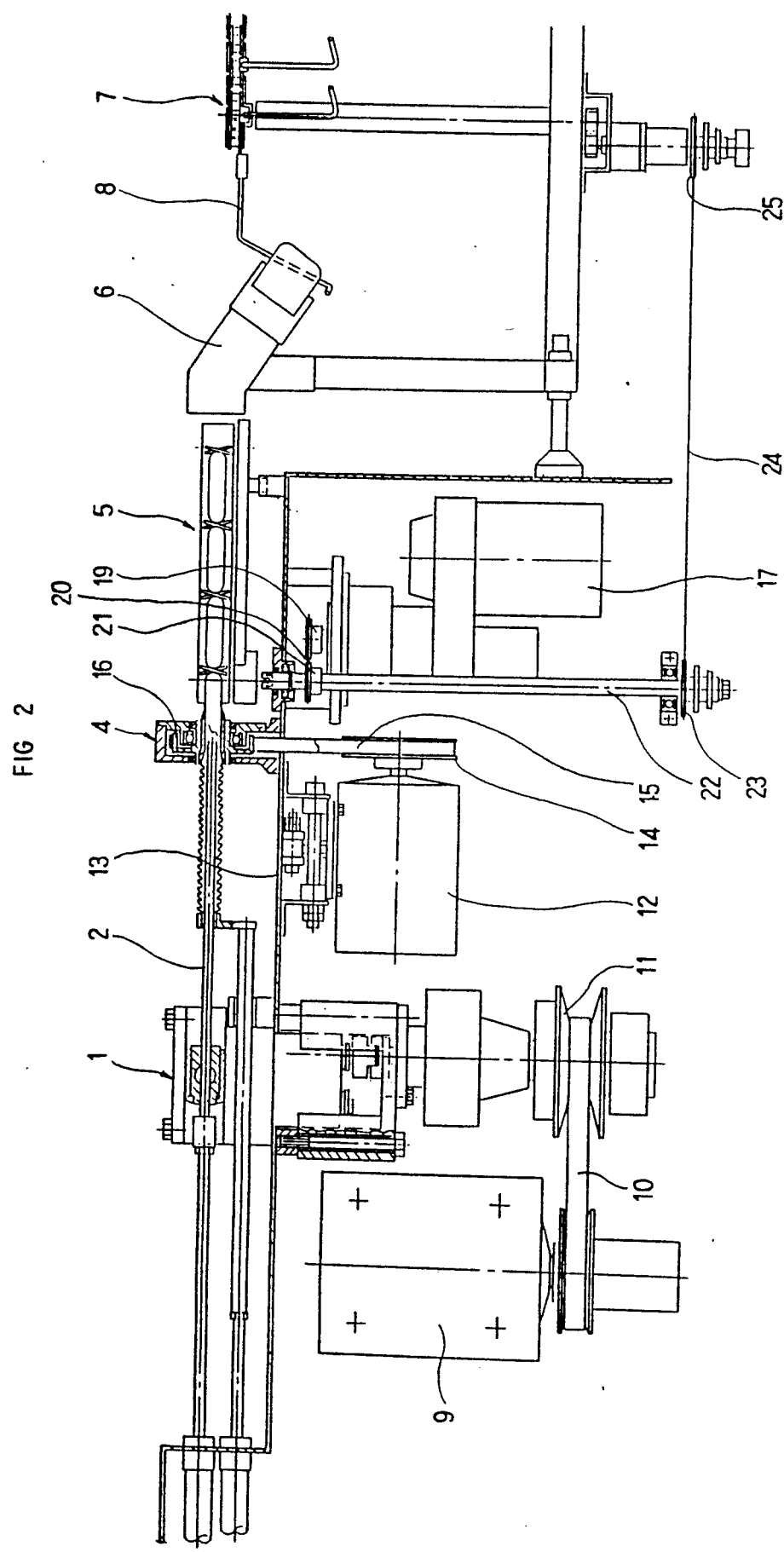
FIG. 2 is a cross-sectional view of essential portions shown in FIG. 1.

FIG. 1 is an overall perspective view of an apparatus for manufacturing sausages or the like in accordance with an embodiment of the present invention, and FIG. 2 is a cross-sectional view of essential portions of the apparatus shown in FIG. 1.

Referring to the drawings, a pump 1 serves to charge a material such as a meat emulsion into a nozzle 2, and a casing supplying device 3 is adapted to accommodate casings (not shown in these drawings) that are stuffed with the material by means of the nozzle 2 and to supply the casings as required. A rotary member driving device 4, which constitutes an essential portion of the present invention, is adapted to rotate the casing in cooperation with a linking portion 5 to impart twists to the casing stuffed with the material. Reference numeral 6 denotes a so-called looper for sequentially suspending an elongated chain of linked sausages or the like stuffed with the material on hooks 8 of a loop conveyor 7 into the form of loops.

To give a more detailed description by mainly referring to FIG. 2, a first motor 9 rotatively drives an output pulley 11 of a belt-type speed changer via a belt 10 of the speed changer, and rotatively drives the pump 1 by means of the output pulley 11 of the speed changer.

The rotary member driving device 4 constituting the essential portion of the present invention is arranged as follows.

A second motor 12 is affixed to a bracket formed integrally with a frame 13 of the manufacturing apparatus, and rotatively drives a pulley 16 serving as a rotary member accommodated in the rotary member driving device 4 by means of a belt 15 wound around a pulley 14 serving as a driving member. The belt 15 in this embodiment is a timing belt with teeth.

A third motor 17 is adapted to drive the linking portion 5 and the loop conveyor 7 and rotates a shaft 22 via a speed reducer 18, a sprocket 19, a chain 20, and a sprocket 21, whereby the linking portion 5 is rotatively driven by the shaft 22 and, at the same time, the loop conveyor 7 is rotatively driven via a sprocket 23 provided on the shaft 22, a chain 24, and a sprocket 25.

Figure 3:
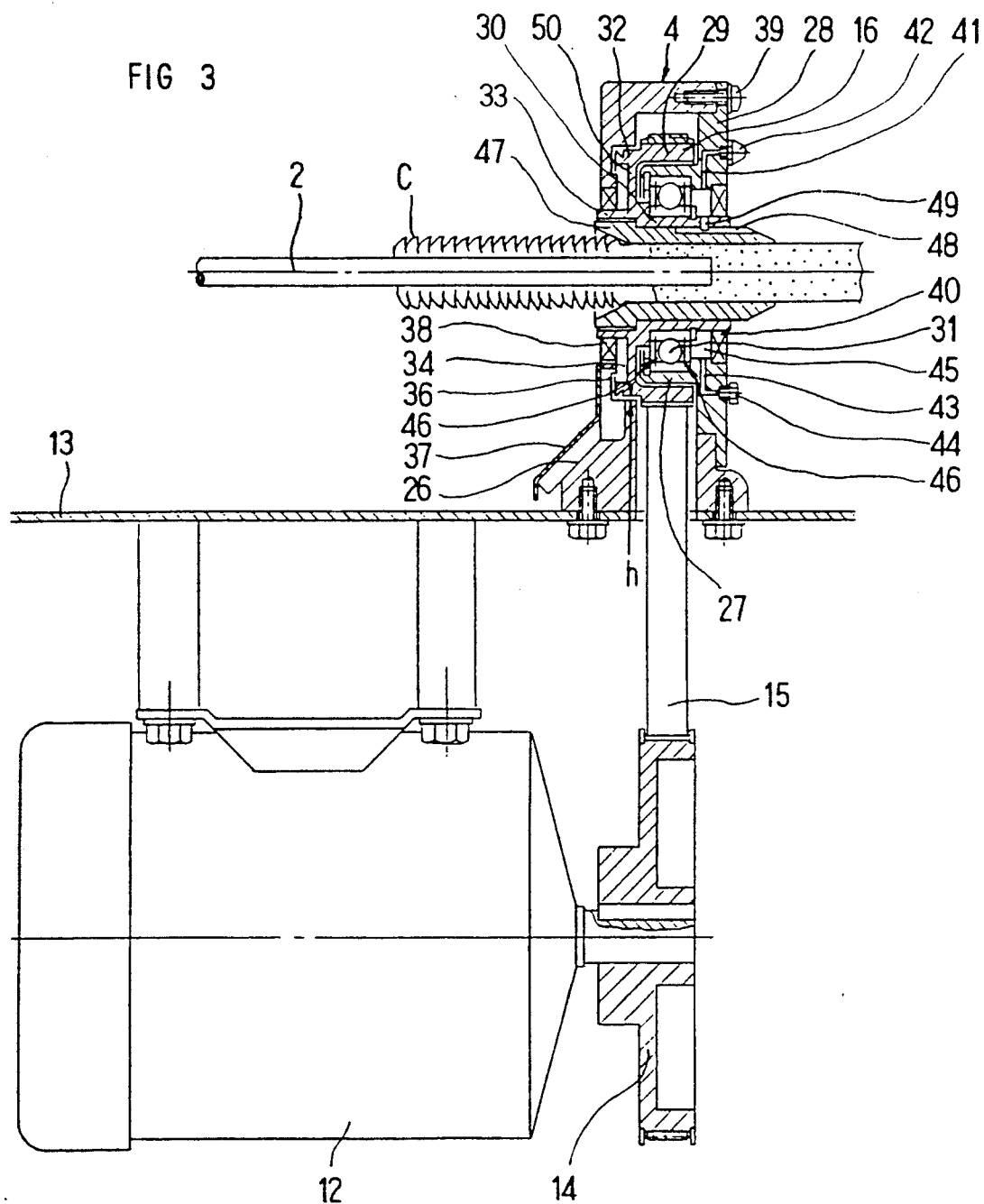
FIG. 3 is a cross-sectional view of a rotatively driving mechanism portion of a rotary member for a chuck.
Figure 4:
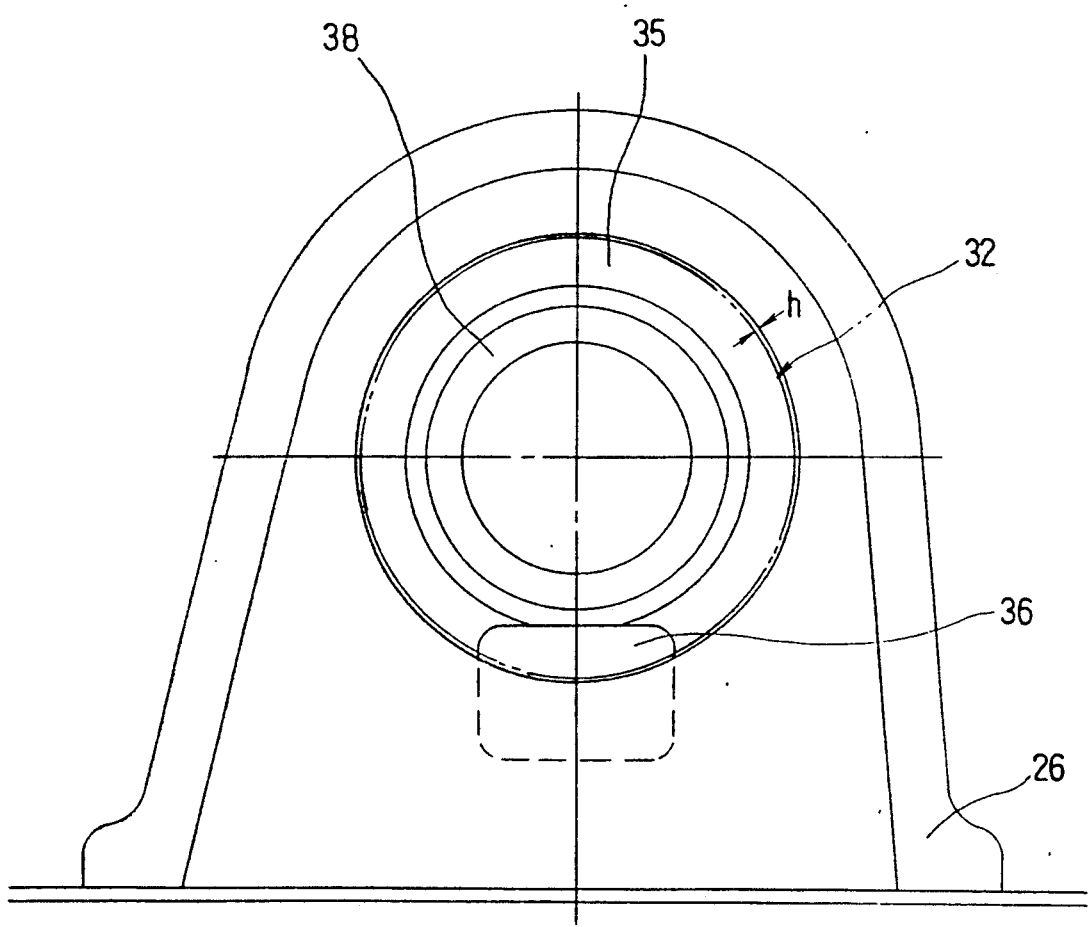
FIG. 4 is a side-elevational view illustrating an opening portion formed in a housing.

Referring now to FIGS. 3 and 4, a detailed description will be given of the rotary member driving device constituting the essential portion of the present invention.

The present invention is characterized in that, in contrast to the conventional wet-type lubricating system, a driving mechanism is adopted which allows the rotary member with the chuck inserted therein to be driven without any lubrication by the use of the timing belt and the like, as described above, and that a system for separately lubricating a bearing of the rotary member is adopted.

Specifically, the pulley 14 provided on the shaft portion of the second motor 12 is a timing pulley of a known type with teeth provided on its outer periphery, and the pulley 16 serving as another rotary member is also provided with teeth on its outer periphery. In addition, the belt 15 is constituted by a known timing belt provided with teeth on its inner side. The rotary member driving device 4 is constituted by the pulley 14, the belt 15, a housing 26 secured to a base 13, a flange 28 having a boss 27, and the pulley 16. The pulley 16 serving as the rotary member has a configuration of a double cylinder consisting of an outer cylinder 29 and an inner cylinder 30, the boss 27 being inserted in an annular groove portion between the outer cylinder 29 and the inner cylinder 30. A bearing 31 is interposed between the inner cylinder 30 and the boss 27. A known slide bearing may be used as the bearing 31. A widthwise central position of the bearing 31 is substantially aligned with a transverse center of the belt 15 so that a force acting on the bearing 31 will not be biased. Formed on the other side of the pulley 16 are a cylindrical portion 32 having an annular projection and a cylindrical shaft portion 33, and an annular groove 34 is formed therebetween. An interval h between the projection and the housing 26 is very small, and the projection has a configuration producing a draining effect.

As particularly shown in FIG. 4, an annular groove portion 35 for accommodating the cylindrical portion 32 of the pulley 16 is provided at an inner wall portion of a side surface of the housing 26, and an opening portion 36 which is open in face-to-face relation to the groove 34 is provided in the groove portion 35. This opening portion 36 serves to discharge a foreign substance, such as the sausage material or the like, should it enter the groove 34 through a sealing means which will be described later. A cover 37 for covering this opening portion 36 is provided and serves as a guard for prevent the scattering of the discharged foreign substance and the entrance of the foreign substance from the outside through the opening portion 36. This cover 37 may be arranged to completely seal the opening portion 36 and may be removed as required. A sealing means 38 is interposed between the housing 26 and the shaft portion 33. This sealing means 38 has a similar configuration to that of a known oil seal, and serves to prevent the entrance of a foreign substance from the outside. The sealing means 38 may be provided with a very small gap with an outside diameter of the shaft portion 33 in connection with the discharging of the foreign substance through the opening portion 36 which will be described later. The flange 28 is affixed to the housing 26 by means of screws 39, and a sealing means 40 is interposed between the housing 26 and the inner cylinder 30. The flange 28 is provided with a grease passage 41, a grease nipple 42 serving as an inlet port for grease, a discharge passage 43, and a stop cock 44. Grease is thus injected into a space 45 defined between the sealing means 40 and the bearing 31. Even if a foreign substance enters the space 45 through the sealing means 40, the foreign substance is discharged together with grease through a port with the stop cock 44 removed. In this embodiment, a pair of sealing plates 46 serving as sealing members for sealing in a lubricant for the bearing 31, e.g., grease, are provided on opposite sides inside the bearing 31. Even if one of the sealing members 46 positioned on the sealing means 40 side is removed, lubrication of the bearing can be effected. A chuck 47 is inserted in the inner cylinder 30, and a vertical groove 48 is formed in an outer periphery of the chuck 47. A pin 49 passing through the inner cylinder 30 is provided in the inner cylinder 30 by being fitted in the vertical groove 48, with the result that the chuck 47 rotates together with the pulley 16 and is mounted on the pulley 16 in such a manner as to be detachable in its axial direction.

Since one embodiment of the present invention is arranged as described above, the rotation of the motor 12 is transmitted as the rotation of the chuck 47 by means of the pulley 14, the belt 15, and the pulley 16 serving as a rotary member. Consequently, the transmission of rotation inside the open-type housing is possible, and the maintenance of the rotary member driving device 4 is facilitated. That is, if the flange 28 is removed by unscrewing the screws 39, the bearing 31, the sealing means 40, and the pulley 16 are also removed together with the flange 28.

In addition, even when the material from the nozzle 2 has entered the housing 26 through the sealing means 38, since the cylindrical portion 32 of the pulley 16 is accommodated in the groove 35 of the housing 26, the interior of the housing is partitioned. Because of this arrangement and since the groove 34 of the pulley 16 is provided with a space, the foreign substance which has entered, such as the material, is discharged through the space via the opening portion 36 and is therefore prevented from being introduced to meshing portions between the belt 15 and the pulley 16 and the bearing 31. Furthermore, since the foreign substance is discharge promptly, it is possible to effect high-speed operation of the rotary member 16 using the noncontact-type sealing means 38 which does not generate heat. Additionally, since a totally closing disk 50 connecting the outer cylinder 29 and the inner cylinder 30 of the rotary member 16 is interposed between the sealing means 38 and the bearing 31 as a shielding means, the bearing 31 is protected from the foreign substance which has entered the housing 26. Also, since the bearing 31 is interposed between the outer cylinder 29 and the inner cylinder 30, only one bearing 31 is capable of supporting the rotary member 16 rotating at high speed, and the axial length of the rotary member can be made short. Moreover, since the driving pulley 14 of the rotary member 16 is directly coupled with the motor 12, the driving mechanism is simplified. If a variable speed motor is used as the aforementioned motor, the required number of revolutions of the chuck 47, which differs depending on the length of the sausage or the like, can be altered without replacing the driving parts.

Figure 5:
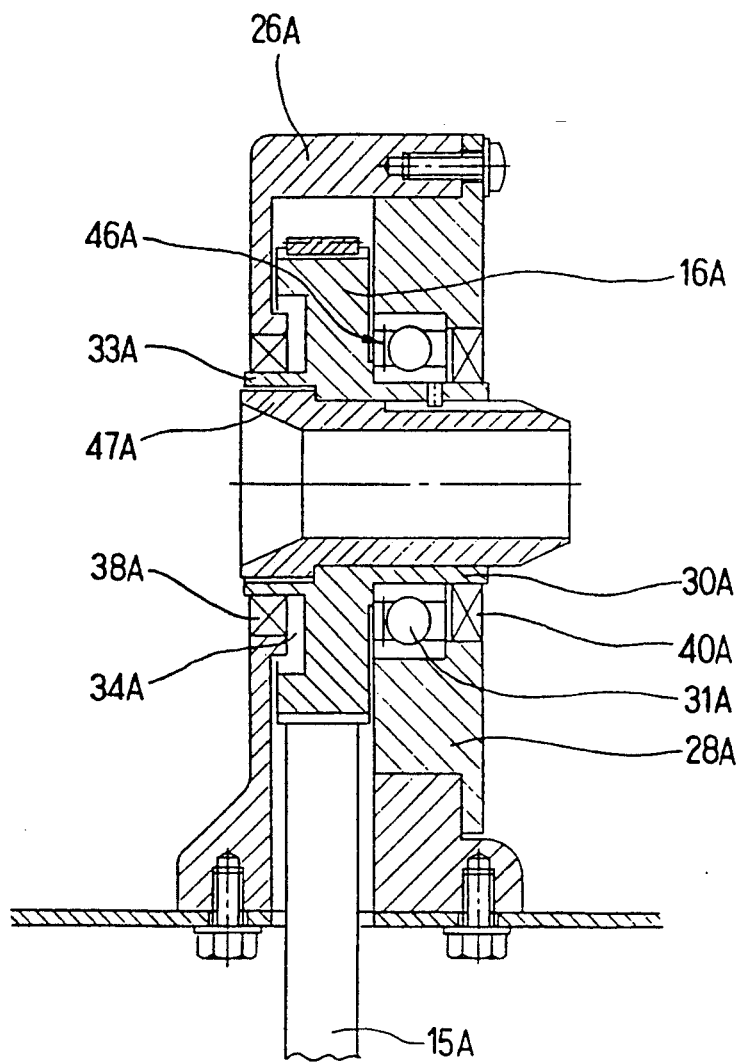
FIG. 5 is a cross-sectional view illustrating another embodiment of a rotatively driving mechanism of the rotary member in accordance with the present invention.

The foregoing is one embodiment of the present invention, and the present invention may alternatively employ a structure such as the one shown in FIG. 5.

That is, in this embodiment, a pulley 16A serving as the rotary member has cylindrical portions 30A, 33A extending in the axial direction thereof. A bearing 31A and a sealing means 40A are interposed between one of the cylindrical portions 30A and a flange 28A, and a sealing means 38A is also interposed between the other cylindrical portion 33A and a housing 26A. Consequently, although the structure is such that a center of a belt 15A is offset from a center of a bearing 31A, this structure is capable of coping with the operation of the pulley 16A which is not rotated at high speed. A sealing plate 46A serving as a sealing member for preventing the passage of grease is provided in the bearing 31A on one side thereof. A chuck 47A is inserted in the cylindrical portions 30A, 33A in the same way as the above-described embodiment.

The sealing means 38A is affixed to the housing 26A in such a manner as to partially enter an annular groove 34A provided in the pulley 16A. As a result, even if the size of the rotary member driving device 4 is restricted in its axial direction, the pulley 16A, the sealing means 38A, 40A, and the bearing 31A can be disposed inside the housing 26A.

In accordance with this embodiment shown in FIG. 5, it is possible to obtain meritorious effects in that the wet-type lubrication can be dispensed with and that maintenance is facilitated by effecting separate lubrication for the bearing. The configurations of the pulley 16A and the flange 28A in this embodiment suitable for low-speed operation are simpler than those of the embodiment shown in FIG. 3, making it possible to obtain a low-cost apparatus.

It should be noted that the pulley 16A in this embodiment may be replaced by an external gear driven without any lubrication.

Although in the above a description has been given of an example in which a timing belt is used as the belt, a V-belt may be used as the belt in the present invention.

Namely, referring now to FIGS. 6A, 6B and 6C, a pulley 16B serving as a rotary member has cylindrical portions 30B and 33B. A bearing 31B is interposed between the cylindrical portion 30B and a flange 28B, and a sealing means 40B and a sealing member 46B are provided on opposite sides of the bearing 31B, a lubricant being sealed therebetween. In addition, a releasing plate $38B_1$ is mounted on an end face of the cylindrical portion 33B by means of screws 51B and is rotatable integrally with the rotary member 16B which also serves as a shielding means. A hollow disk $38B_2$, which is provided with a bore portion 52B having an inside diameter slightly larger than the outside diameter of a boss of the releasing plate $38B_1$ and with an annular portion 53B for accommodating the releasing plate $38B_1$ therein, is mounted on the housing 26B by means of screws 54B, the housing 26B being provided at its side portion with a through-hole having an inside diameter slightly larger than the outside diameter of the cylindrical portion 33B. The hollow disk $38B_2$ and the releasing plate $38B_1$ constitute a sealing means 38B. The hollow disk $38B_2$ is provided with radially extending grooves 55B, and these grooves 55B facing the aforementioned side portion of the housing 26B form discharge passages for discharging to the outside the material has been scattered by a centrifugal force derived from the rotation of the releasing plate $38B_1$. As a result, the leaked material is prevented from contaminating the bearing 31B and the sealing member 46B.

In this embodiment as well, the center of the V-shaped belt 15B and the center of the bearing 31B are offset in the axial direction. However, since the transmission of the driving force is effected by the V-belt in which meandering motion is unlikely to occur, this arrangement is suitable to high-speed operation of the pulley 16B. In this embodiment, since the sealing means 38B functions as a noncontact labyrinth seal which is free of friction, a temperature rise and abrasion do not take place in this portion, thereby contributing to the long life of the relevant parts.

In accordance with this embodiment shown in FIGS. 6A to 6C, it is also possible to obtain the meritorious effects that the wet-type lubrication can be dispensed with and that maintenance is facilitated by effecting separate lubrication for the bearing.

Although in the foregoing embodiments the mechanism for driving the rotary member in which the chuck is fitted is based on belt transmission, the driving of the rotary member may be effected by a gear transmission mechanism in the present invention.

Figure 7:
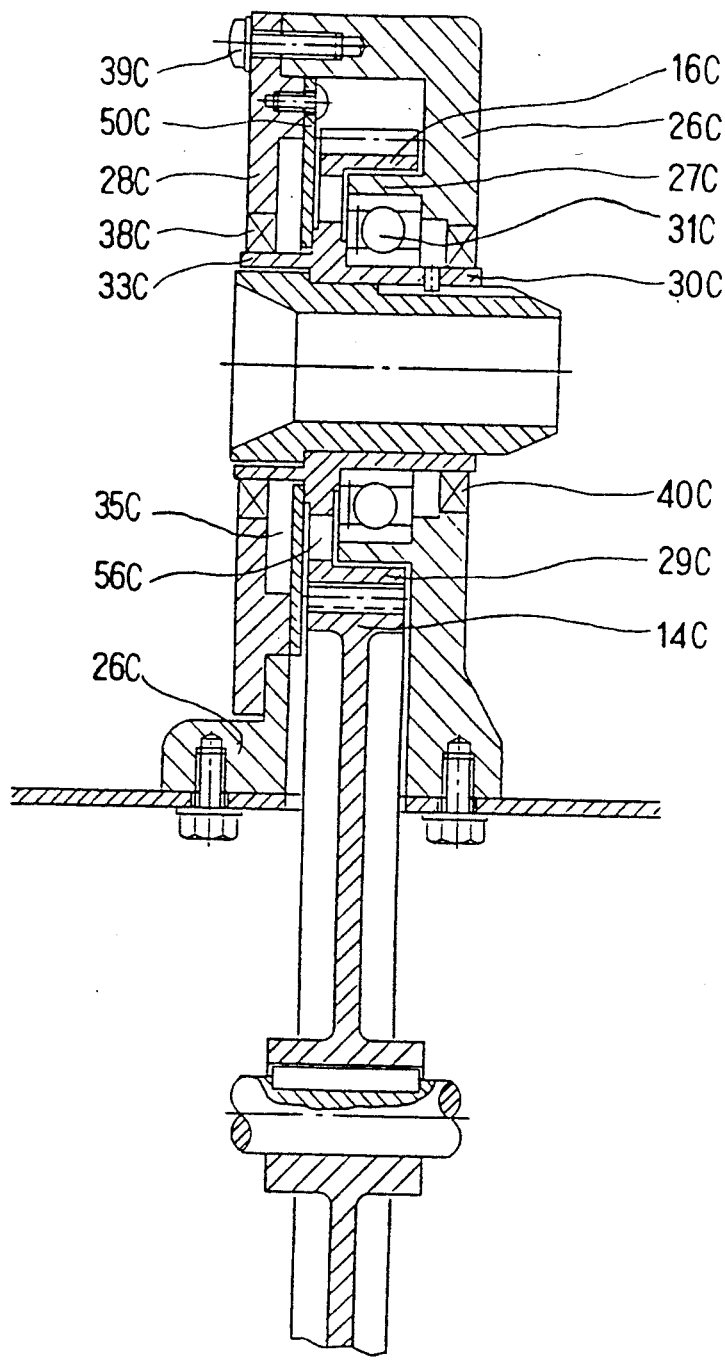
FIG. 7 is a cross-sectional view illustrating a rotatively driving mechanism of a further rotary member in accordance with the present invention.

That is, referring to FIG. 7, a gear 16C serving as a rotary member is constituted by an external gear provided with teeth on its outer periphery. A gear 14C for driving the gear 16C is also formed as an external gear provided with teeth on its outer periphery. The gear 16C may be formed of a metal, and the gear 14C a resin, or vice versa, such that the driving of the rotary member can be effected with no lubrication. The gear 16C serving as a rotary member has a configuration of a double cylinder consisting of an outer cylinder 29C and an inner cylinder 30C, and a boss 27C of a housing 26C is inserted in an annular groove portion between the outer cylinder 29C and the inner cylinder 30C. A bearing 31C is interposed between the inner cylinder 30C and the boss 27C, a sealing means 40C being disposed on an outer side thereof. The widthwise central position of the bearing 31C is substantially aligned with the transverse center of an external gear portion of the rotary member 16C, so that a force acting on the bearing 31C will not be biased. A cylindrical shaft portion 33C is formed on the other side of the rotary member 16C, and a sealing means 38C is interposed between a flange 28C mounted on a side portion of the housing 26C by means of a screw 39C and the shaft portion 33C. A fixed sealing plate 50C serving as a shielding means which is brought into sliding contact with the other side surface of the rotary member 16C is provided. This fixed sealing plate 50C is screwed onto the flange 28C, and a discharge space 35C for accummulating therein the material or the like which has entered through the sealing means 38C is formed between the fixed sealing plate 50C and a recess formed in the flange. As for this discharge space, since the flange 28C and the housing 26C can be removed, the material or the like which has accumulated in the discharge space 35C can be periodically removed to outside the housing 26C. Since the aforementioned fixed sealing plate 50C also serves as a shielding means, the rotary member 16C can be provided with a multiplicity of through-holes 56C for making the rotary member 16C lightweight.

In the apparatus of the above-described embodiment as well, it is possible to obtain meritorious effects in that the wet-type lubrication can be dispensed with and that maintenance is facilitated by effecting separate lubrication for the bearing.

Figure 8:
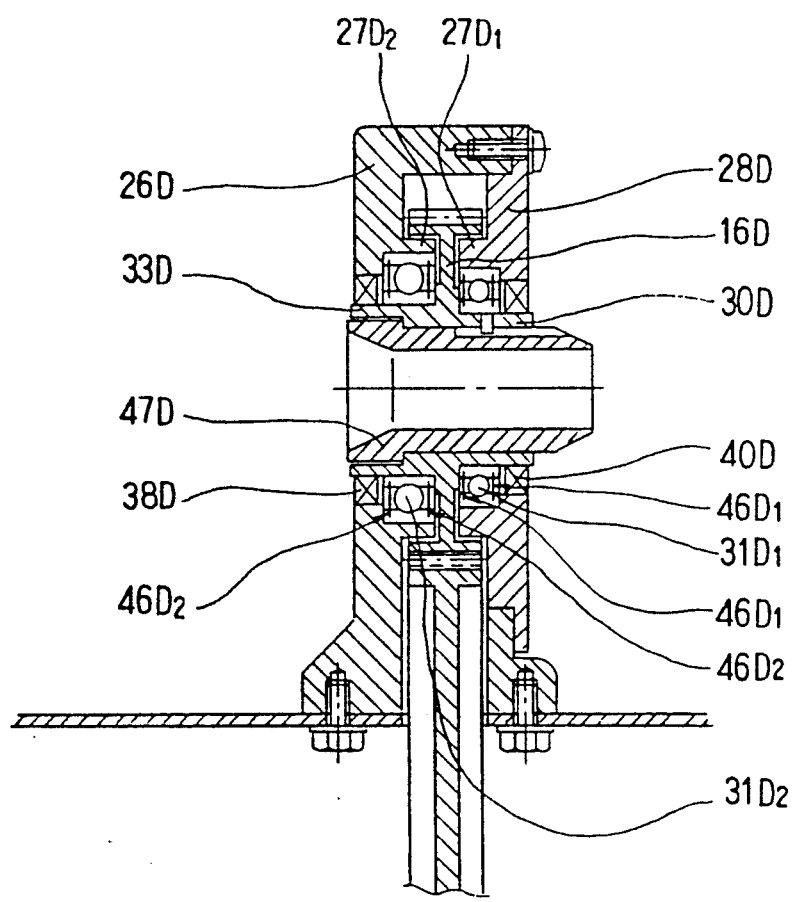
FIG. 8 is a cross-sectional view illustrating a rotatively driving mechanism of a still further rotary member in accordance with the present invention.
Figure 9:
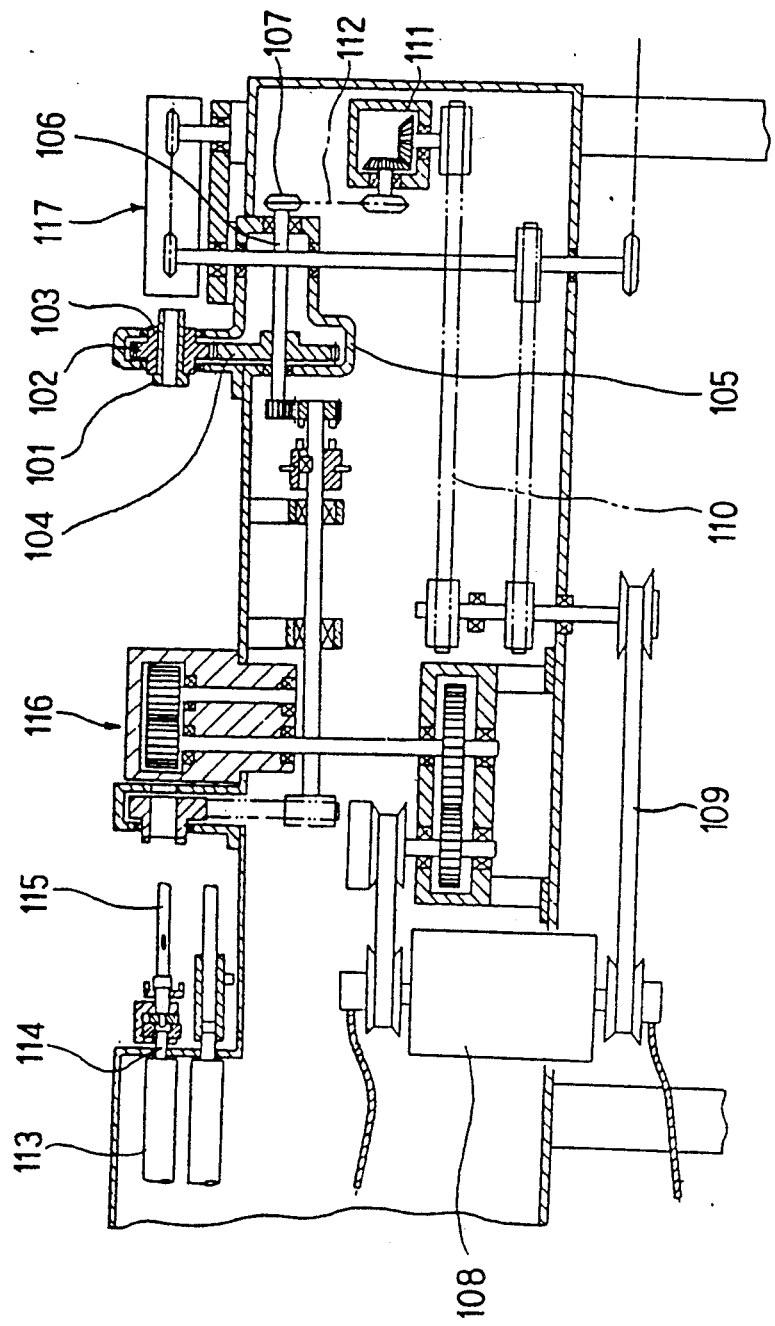

In addition, as an embodiment of the gear transmission mechanism, it is possible to adopt a structure shown in FIG. 8.

A rotary member 16D has cylindrical portions 30D, 33D extending in the axial direction, a bearing $31D_1$ is interposed between the cylindrical portion 30D and a boss $27D_1$ of a flange 28D, and a bearing $31D_2$ is interposed between a boss $27D_2$ of a housing 26D and the cylindrical portion 33D. Two pairs of sealing plates $46D_1$, $46D_2$ serving as sealing members are respectively provided on opposite sides inside the bearings $31D_1$, $31D_2$, grease being sealed between the sealing plates inside the respective bearings. A sealing means 40D is provided between the cylindrical portion 30D and the flange 28D and outside the bearing $31D_1$, while a sealing means 38D is provided between the housing 26D and the cylindrical portion 33D and outside the bearing $31D_2$. Since the material is prevented from entering the interior of the bearing $31D_2$ by means of the sealing means 38D and the sealing member $46D_2$, the life of the bearing is prolonged. In this embodiment as well, the center of the meshing portions of the gear and the center between the two bearings $31D_1$, $31D_2$ are substantially aligned with each other, so that forces acting on the bearings $31D_1$ and $31D_2$ will not be biased.

In accordance with this embodiment, even if the width of the rotary member driving device in the axial direction is restricted, the bearings can be disposed on the opposite sides of the rotary member, so that assembly accuracy required for gear transmission can be ensured.

It should be noted that the rotary member 16D of this embodiment may be substituted by a timing pulley or a wrapping connector driving pulley such as a V-belt pulley. In the apparatus of this embodiment as well, it is possible to obtain meritorious effects in that the wet-type lubrication can be dispensed with and that maintenance is facilitated by effecting separate lubrication for the bearing.

The respective constituent elements in all the aforementioned embodiments may be combined in various forms.

The advantages of the present invention which is constructed and operated as described above are as follows.

Since, unlike the conventional wet-type lubrication, the rotary member is not rotatively driven in a state in which it is immersed in a lubricating oil, the rotary member driving mechanism for rotating the chuck becomes a mechanism which effects rotative driving in a non-lubricated state. For this reason, there is no deterioration of the lubricating oil, and the abnormal wear, partial wear, and breakage of sliding portions due to the entrance of a foreign substance into the lubricating oil do not take place.

In addition, as compared with the conventional wet-type lubricating system, the structure of the rotatively driving mechanism becomes simple, and maintenance is facilitated remarkably.

In the apparatus which is provided with a foreign substance shielding member interposed between the sealing means for preventing the entrance of the foreign substance and the bearing for the rotary member, it becomes further difficult for the leaked material to enter the interior of the bearing, and the abnormal wear of the bearing and a decline in its durability do not occur.

Should a foreign substance such as the material pass through the sealing means, if the discharging means is provided, it is possible to discharge the same before reaching the bearing and the like, so that the entrance of the foreign substance into the bearing can be prevented more positively.

If the foreign substance shielding member and the discharging means are provided jointly, the noncontact sealing means can be used, so that heat is not generated and high-speed rotation of the rotary member is made possible.

If the arrangement provided is such that the bearing and the sealing means are interposed between the cylindrical portion of the rotary member and the flange or the boss of the housing, the axial length of the rotary member can be reduced, so that the nozzle length can be shortened by that margin, and damage (ordinarily called smear) attributable to the mixing of the material is reduced.

What is claimed is:

1. An apparatus for manufacturing sausages or the like including a nozzle for stuffing a material such as a meat emulsion into a casing for sausages or the like, a pump for supplying the material into said nozzle, a chuck for rotating the casing stuffed by said nozzle, and a linking device for clamping the stuffed casing discharged from said chuck and forming the casing stuffed with the material into the form of a chain in cooperation with said chuck, said apparatus comprising:
    a device for driving said chuck, said device including a housing, a rotary member accommodated rotatably inside said housing and adapted to rotate said chuck with said chuck inserted and fixed therein, a bearing for rotatably supporting said rotary member, sealing means for preventing the entrance of a foreign substance such as the material into said bearing, and rotation transmitting means for driving said rotary member, said bearing having a sealing member for sealing a lubricant for said bearing in said bearing.

2. An apparatus for manufacturing sausages or the like according to claim 1, wherein said rotary member is a pulley and said rotation transmitting means for rotatively driving said rotary member is constituted by a wrapping connector driving gear.

3. An apparatus for manufacturing sausages or the like according to claim 1, wherein said bearing for supporting said rotary member is provided in a flange for closing a side surface of said housing, and said rotary member is removable to the outside by removing said flange from said housing.

4. An apparatus for manufacturing sausages or the like according to claim 1, further comprising shielding means for preventing the entrance of the foreign substance between said sealing means and said bearing.

5. An apparatus for manufacturing sausages or the like according to claim 4, wherein said rotary member also serves as said shielding means.

6. An apparatus for manufacturing sausages or the like according to claim 4, wherein said shielding means is a fixed plate provided in said housing independently from said rotary member.

7. An apparatus for manufacturing sausages or the like according to claim 1, wherein a space for discharging the foreign substance which has entered between said sealing means and said bearing to outside said housing is provided in said housing.

8. An apparatus for manufacturing sausages or the like according to claim 7, wherein said space for discharging the foreign substance which has entered between said sealing means and said bearing to outside said housing is constituted by a space partitioned by a recessed portion formed in said rotary member and said housing, a discharge passage communicating with said space being constituted by an opening formed in said housing.

9. An apparatus for manufacturing sausages or the like according to claim 7, wherein said space for discharging the foreign substance entering between said sealing means and said bearing to outside said housing is constituted by a space formed by a flange for closing a side surface of said housing and a fixing plate serving as said shielding means mounted on said flange, said flange being removable to the outside.

10. An apparatus for manufacturing sausages or the like according to claim 1, wherein said bearing for supporting said rotary member is disposed in an annular groove formed between an outer cylinder and an inner cylinder of said rotary member.

11. An apparatus for manufacturing sausages or the like according to claim 10, wherein a widthwise central position of said bearing is substantially aligned with a position of a point where a driving force acts on said rotary member.

12. An apparatus for manufacturing sausages or the like according to claim 1, wherein said sealing means is disposed in said annular groove formed between said outer cylinder and said inner cylinder of said rotary member.

13. An apparatus for manufacturing sausages or the like according to claim 1, wherein said sealing member is disposed on at least one side of said bearing.

14. An apparatus for manufacturing sausages or the like according to claim 1, wherein a space for charging a lubricant such as grease is provided between said sealing means and said bearing.

15. An apparatus for manufacturing sausages or the like according to claim 1, wherein a driving member for rotating said rotary member is directly coupled with a motor.

* * * * *

UNITED STATES PATENT AND TRADEMARK OFFICE
CERTIFICATE OF CORRECTION

PATENT NO. : 5,064,401
DATED : November 12, 1991
INVENTOR(S) : Minoru Kasai, et. al.

It is certified that error appears in the above-indentified patent and that said Letters Patent is hereby corrected as shown below:

Column 1, line 13, change "2Description of the Related Art" to --2. Description of the Related Art--;

Column 6, line 3, change "discharge" to --discharged--.

Column 10, line 17, change "from" to --of--.

Signed and Sealed this

Fifteenth Day of March, 1994

Attest:

BRUCE LEHMAN

Attesting Officer

Commissioner of Patents and Trademarks